United States Patent
Monga et al.

(10) Patent No.: US 8,315,159 B2
(45) Date of Patent: Nov. 20, 2012

(54) UTILIZING OPTICAL BYPASS LINKS IN A COMMUNICATION NETWORK

(75) Inventors: Indermohan Monga, Acton, MA (US); Donald Fedyk, Groton, MA (US); Bruce Schofield, Tyngsboro, MA (US)

(73) Assignee: Rockstar Bidco, LP, New York, NY (US)

( * ) Notice: Subject to any disclaimer, the term of this patent is extended or adjusted under 35 U.S.C. 154(b) by 901 days.

(21) Appl. No.: 12/413,150

(22) Filed: Mar. 27, 2009

(65) Prior Publication Data

US 2010/0061719 A1 Mar. 11, 2010

Related U.S. Application Data

(60) Provisional application No. 61/191,712, filed on Sep. 11, 2008.

(51) Int. Cl.
*G06F 11/00* (2006.01)

(52) U.S. Cl. ........ 370/222; 370/221; 370/235; 370/237; 398/2; 398/5

(58) Field of Classification Search .......... None
See application file for complete search history.

(56) References Cited

U.S. PATENT DOCUMENTS

| | | | | |
|---|---|---|---|---|
| 7,835,267 | B2* | 11/2010 | Zamfir et al. | 370/216 |
| 2002/0109887 | A1* | 8/2002 | Aburakawa et al. | 359/172 |
| 2003/0020977 | A1* | 1/2003 | Smith et al. | 359/110 |
| 2003/0156536 | A1* | 8/2003 | Oki et al. | 370/229 |
| 2003/0229700 | A1 | 12/2003 | Moore et al. | |
| 2007/0041326 | A1 | 2/2007 | Babiarz et al. | |
| 2009/0252166 | A1* | 10/2009 | Handelman | 370/391 |
| 2010/0172238 | A1* | 7/2010 | Saltsidis et al. | 370/228 |
| 2010/0208593 | A1* | 8/2010 | Soon et al. | 370/242 |

FOREIGN PATENT DOCUMENTS

| | | |
|---|---|---|
| JP | 2003-218915 | 7/2003 |
| WO | WO 00/69211 | 11/2000 |
| WO | WO 02/15451 | 2/2002 |

OTHER PUBLICATIONS

Written Opinion of the International Searching Authority from corresponding PCT application PCT/US2009/051130.

* cited by examiner

*Primary Examiner* — Donald Mills (74) *Attorney, Agent, or Firm* — Withrow & Terranova, PLLC (57) ABSTRACT

Optical By-Pass (OBP) links may be created by adding wavelengths between nodes on the network. The OBP may extend between any pair of nodes on the network. Intermediate nodes on the OBP are transient nodes and simply forward traffic optically. An OBP extends between a pair of nodes and, unlike express links, is created in such a manner that it does not affect the previous allocation of resources on the network. This enables capacity to be added between pairs of nodes on the network to alleviate congestion at a portion of the network, without changing other traffic patterns on the network. This enables inclusion of an OBP to be deterministic and of linear impact on the network. The OBP links may be statically provisioned or created on demand. Optionally, the OBP links may be crated to coincide with PBB-TE tunnels on the network.

20 Claims, 5 Drawing Sheets

| PBB-TE path | From | To |
|---|---|---|
| 74A | Los Angeles | Seattle |
| 74B | Los Angeles | San Francisco |
| 74C | San Francisco | Denver |
| 74D | Denver | Chicago |
| 74E | Denver | Memphis |
| 74F | Chicago | Boston |
| 74G | Memphis | Boston |
| 74H | New York | Wash. DC |
| 74I | Los Angeles | Miami |

UTILIZING OPTICAL BYPASS LINKS IN A COMMUNICATION NETWORK

CROSS-REFERENCE TO RELATED APPLICATIONS

This application claims priority to U.S. Provisional Patent Application Ser. No. 61/191,712 filed Sep. 11, 2008, the content of which is hereby incorporated herein by reference.

TECHNICAL FIELD

The present invention relates to communication networks and, more particularly, to a method and apparatus for utilizing optical bypass links in a communication network.

BACKGROUND

Data communication networks may include switches and routers coupled together to receive and forward data between each other. These devices will be referred to herein as "network elements." A network element is generally not a consumer of the data, but rather is used to receive and forward data so that the data may pass through the network. Data is communicated through a network by enabling the network elements to pass protocol data units, such as frames or packets, between each other over communication links. A particular protocol data unit may be handled by multiple network elements and cross multiple communication links as it travels between its source and its destination over the network.

Long haul networks typically use optical links to transport data between the network elements. When a network element receives optical signals on an optical link, the network element may either convert the optical signals to electrical signals for processing, or may use an Optical Add Drop Multiplexers (OADM) to directly switch the optical signals from one optical fiber to another optical fiber. Optical cards are generally less expensive than cards which convert the optical signals to electrical signals, and thus it is often preferable to handle data optically when possible. OADMs may be statically configured or may be reconfigurable (ROADMs), so that the manner in which the node operates may be remotely changed.

The demand for optical resources may not be optimally met by an initial communication network design. Hence, particular links or areas of the network may experience congestion. Likewise, over time, congestion may develop as traffic patterns change. To alleviate congestion, it is common to create an express link to add a wavelength and, hence bandwidth, between a particular set of nodes. The express link may go one hop on the network or may be set up to extend through multiple hops on the network. Where the express link goes through an intermediate node, the intermediate node will optically forward the traffic using an OADM and treat the traffic as transient traffic. Express links are typically manually configured and provisioned, and then optically signaled to cause the nodes on the network to add the wavelength(s) for the express link.

Figure 1:
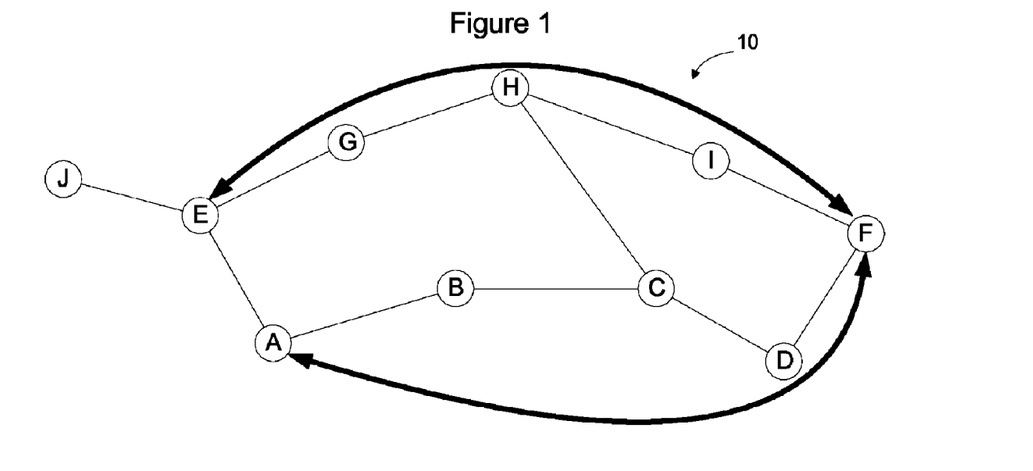
FIG. 1 is a functional block diagram of an example communication network and showing routes through the network in the absence of an express link.
Figure 2:
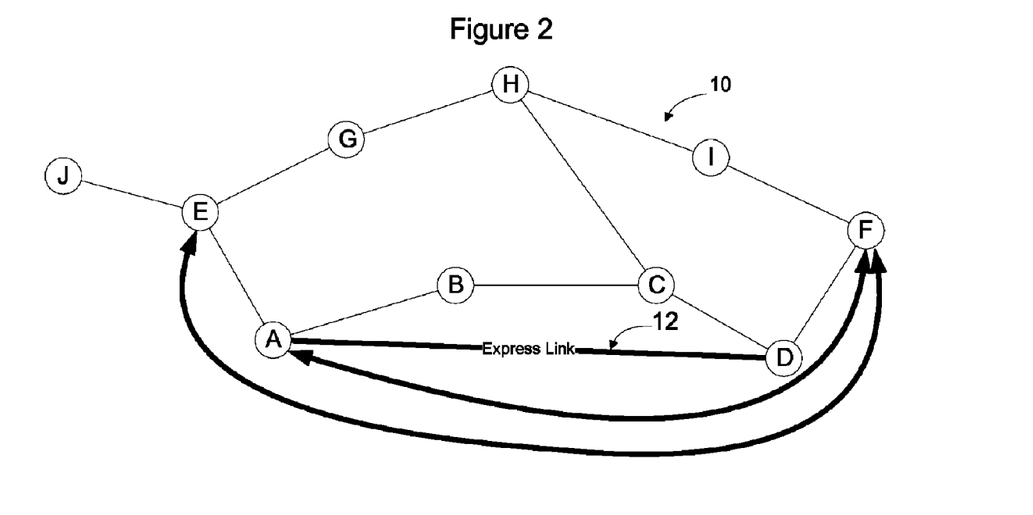
FIG. 2 is a functional block diagram of the example communication network of FIG. 1 and showing how routes through the network change with the addition of an express link.

FIG. 1 shows an example communication network 10. In this example, traffic that is flowing between nodes E and F will follow the top path (E, G, H, I, F) while traffic flowing between node A and F will follow the bottom path (A, B, C, D, F). If an express link 12 is added, as shown in FIG. 2, the new express link will be advertised by the network routing system so that all nodes will update the topology to reflect the new link. As the topology changes, this will cause the nodes to recalculate the paths through the network. For example, as shown in FIG. 2, when an express link is added between nodes A-D, this may cause traffic between nodes E and F to switch to follow path (E, A, D, F). Thus, when an express link is added to the network to alleviate congestion, it may in fact cause additional traffic to be re-routed toward the area of the network that is already experiencing congestion. One reason for this is that IP traffic and MPLS traffic will see the express link as a single hop in the routing tables, which may make the path over the express link shorter and, hence, preferable to another path through the network. This may cause some of the traffic to be diverted to traverse the newly added express link. Accordingly, rather than helping alleviate congestion, the addition of the express link may draw additional traffic to a congested area of the network.

Figure 3:
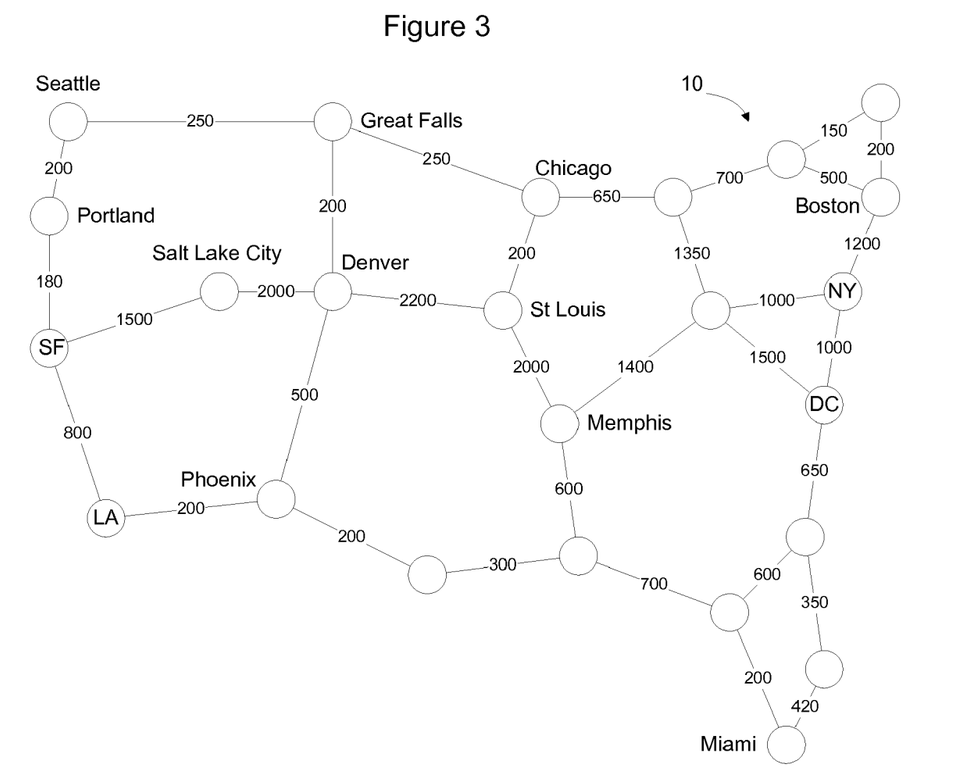
FIG. 3 is a functional block diagram of an example long haul communication network showing the traffic loading on the links before inclusion of an express link.
Figure 4:
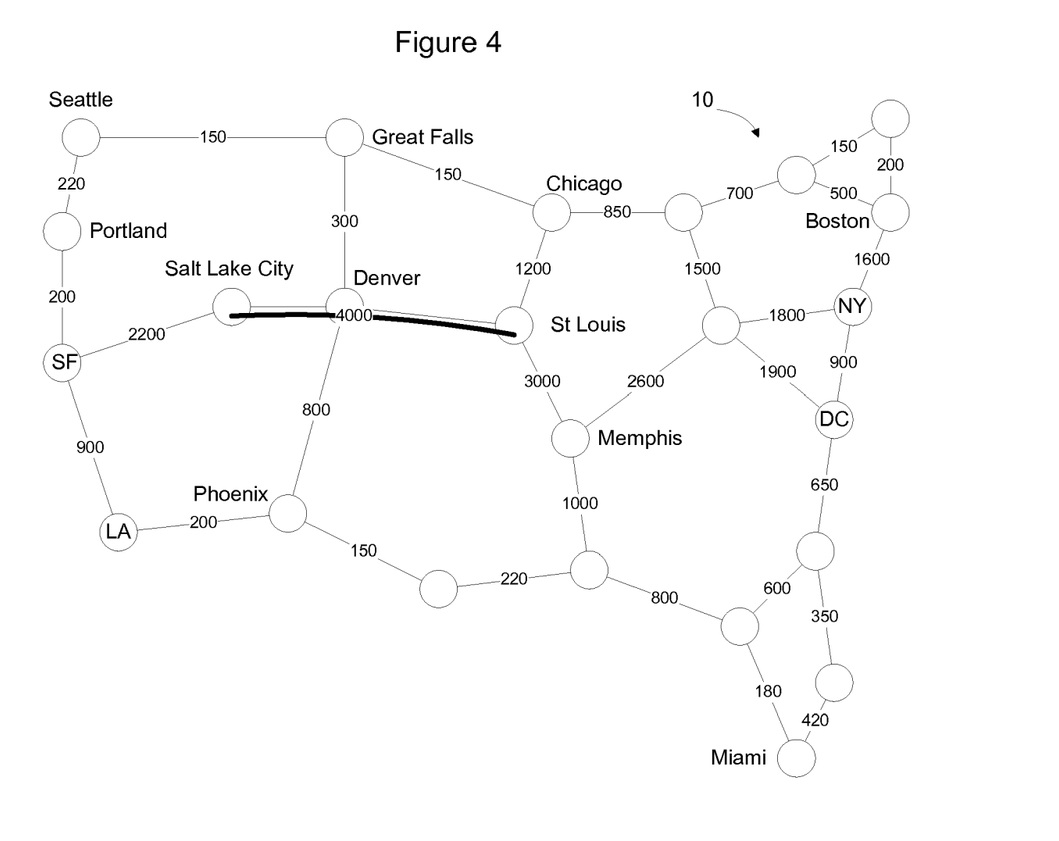
FIG. 4 is a functional block diagram of the example long haul communication network of FIG. 1 showing an hypothetical example change in traffic patterns caused by inclusion of an express link.

FIG. 3 shows an example long haul network that may be implemented over a large geographic area, such as the United States. In FIG. 3, it will be assumed that the network has a high volume of traffic between Salt Lake City and St. Louis. To alleviate this congestion, as shown in FIG. 4, an express link may be created to carry traffic directly between Salt Lake City and St. Louis. Once this link is added, the other nodes on the network will recognize the new link, which will change the other traffic patterns. For example, inclusion of the new link can cause traffic on other links to increase dramatically, such as the link between Chicago and St. Louis, while causing the utilization of other links to decrease substantially. Indeed, it has been found that adding a link can affect many links of the network, even those which are geographically remote from the new express link.

Accordingly, although adding an express link can alleviate congestion, it also causes all of the traffic patterns on the network to change which can result in the creation of new congestion points. The congestion points may be located near the new link or very far away from the link on the network.

Thus, optimization of the network becomes an iterative process, in which as new links are added, the traffic patterns are adjusted to reveal new hot-spots, which then must be alleviated through the addition of other links. This process may be iterated several times. Additionally, it is possible that the resultant network design may not be the optimal network design, because each link is added serially. For example, when a first express link is added to alleviate one region of congestion, and then a second express link is added to alleviate a new area of congestion caused by addition of the first express link, the second express link may make the first link superfluous. Stated differently it may be that the first express link is no longer required because addition of the second express link may cause traffic to be re-routed away from the area of the first express link to thereby obviate the efficacy of the first express link. This interdependency of the various traffic flows and link loading makes addition of network capacity difficult to implement efficiently and effectively. Accordingly, it would be advantageous to provide a way to more effectively utilize express links to alleviate congestion in the network.

SUMMARY OF THE INVENTION

Optical By-Pass (OBP) links may be created by adding wavelengths between nodes on the network. The OBP may extend between any pair of nodes on the network. Intermediate nodes on the OBP are transient nodes and simply forward traffic optically. An OBP extends between a pair of nodes and, unlike express links, is created in such a manner that it does not affect the previous allocation of resources on the network. This enables capacity to be added between pairs of nodes on the network to alleviate congestion at a portion of the network, without changing other traffic patterns on the network. This enables inclusion of an OBP to be deterministic and of linear impact on the network. The OBP links may be statically provisioned or created on demand. Optionally, the OBP links may be crated to coincide with PBB-TE tunnels on the network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 5:
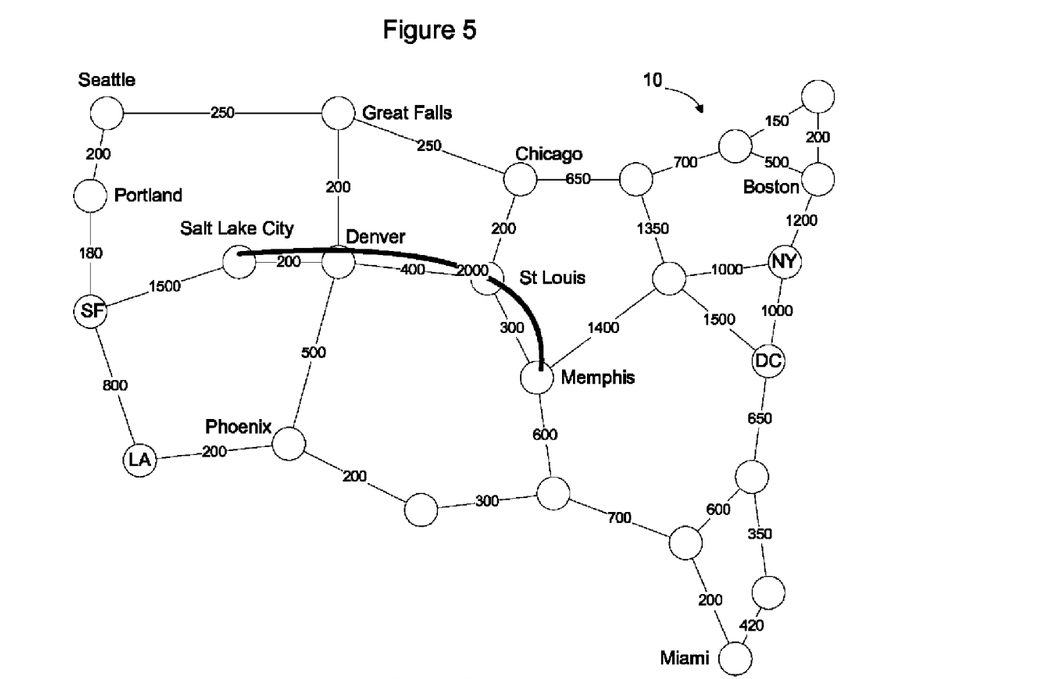
FIG. 5 is a functional block diagram of the example long haul communication network of FIG. 1 after inclusion of an optical bypass (OBP) link according to an embodiment of the invention.

FIG. 3 shows an example communication network and example traffic loading on the links of the communication network. The number on the links represent a dimensionless traffic volume on the links on the network. The higher the number the greater amount of traffic flowing on the links of the network. FIG. 5 shows the same communication network as FIG. 3, with the same traffic patterns, but in which an optical bypass (OBP) link has been created between Salt Lake City and Memphis. In the example shown in FIG. 5, the loading of the links other than the affected links between Salt Lake City and Denver, between Denver and St Louis, and between St. Louis and Memphis, are unchanged. Specifically, when comparing the network link utilization of the example network of FIG. 3 with the network link utilization of the example network of FIG. 5, it is clear that the inclusion of the OBP link did not affect the traffic patterns on other links on the network. This directly flows from the fact that the OBP link was created in such a manner as to not affect resource allocation on the network. For example, in one embodiment, the OBP link is not advertised via the network routing system to the other nodes and, hence, the other nodes are not able to route traffic over the OBP link. Since the other nodes don't know about the OBP link they cannot route traffic over it. Hence, the other traffic patterns on the network are unaffected by the inclusion of the optical bypass link.

The end nodes, Salt Lake City and Memphis, may place traffic onto the OBP link or may transmit traffic hop-by-hop through the network. Selection of which link to utilize is localized to the end node and is independent of other nodes on the network. The intermediate nodes, Denver and St. Louis, optically forward traffic on the OBP link as transient traffic. Thus, the intermediate nodes do not add or drop traffic from the OBP link but rather simply optically switch the traffic to cause the traffic on the OBP link to follow the OBP link through the network. Suitable signaling may be used to cause the end nodes to switch traffic onto the OBP link and to enable the intermediate nodes to set up the correct forwarding state in their data planes, e.g. to configure their ROADM to optically forward traffic on the OBP link. OBP links may be set up in the same manner that express links are currently set up on optical networks, with the exception that they are not advertised by any of the nodes or are otherwise created so as to not affect resource allocation, so that use of the OBP link, from a network traffic perspective, is confined to the end nodes.

As shown in FIG. 5, the concept of an optical bypass is created where the traffic path follows the packet layer's forwarding topology, but avoids packet forwarding in one or more of the intermediate nodes. In this example, the intermediate nodes do not perform packet forwarding since they simply optically switch traffic on the OBP through the network.

The communication network will typically run a routing protocol such as Open Shortest Path First (OSPF) or Intermediate System to Intermediate System (IS-IS). The routing protocol enables the nodes to learn the topology of the network. The nodes can then use the knowledge of the topology to calculate routes through the network. As the topology of the network changes, the nodes will adjust the routes used to carry traffic through the network to accommodate the new topology.

According to an embodiment of the invention, creation of OBP links does not affect the routing view of the network so that the routing system has a fixed view of resources on the network that is not dependent on the OBP links. For example, the OBP links may not be advertised using routing Link State Advertisements (LSAs) so that the nodes on the network do not include the OBP links in their routing topology. Alternatively, the OBP links may be advertised in such a way that they do not affect the routing system view of the available network resources. Similarly, the network may maintain Ethernet adjacencies and paths, and likewise may maintain IP adjacencies and paths. Creation of OBP links should either not be advertised or advertised in such a manner that these paths and adjacencies are not affected by creation of the OBP links.

Although the inclusion of OBP links does not affect allocation of network resources, the end devices that connect to the OBP links are configured to aggregate traffic onto the OBP link so that the end node can use the OBP links to alleviate congestion on the network along the path serviced by the OBP links. The end nodes are able to use the OBP link, because of inclusion of a switching function which exists outside of the routing/forwarding function, so that traffic may be selectively diverted onto the OBP link by the end nodes. This enables the nodes on the ends of the OBP link to forward traffic to each other over the OBP link to alleviate congestion on the hop-by-hop links.

In one embodiment, the OBP links are not advertised via the routing system so that they are not included in the nodes' network topology databases. This enables the end nodes to use the OBP links without having establishment of the OBP links affect other traffic patterns on the network. In another embodiment, the OBP links are advertised via the routing system so that the other nodes know about the existence of the OBP links, but the cost of the OBP links is set very high so that the nodes will not route traffic on the OBP links.

OBP links may be statically provisioned or dynamically created based on traffic heuristics, explicit requests, or through other provisioning systems. For example, a network operator may determine that the network loading between a pair of nodes is too high, and statically provision an OBP link between the nodes to alleviate congestion in that area of the network. Alternatively, the nodes on the network may receive a request to establish a connection such as a PBB-TE tunnel and determine that optimal routing of the connection will overload a portion of the network. Rather than routing the connection along a sub-optimal path through the network, the nodes may establish an OBP link to correspond to the connection to alleviate the congestion on the route.

Once an OBP link has been created, the source node may aggregate traffic from engineered paths or other flows that are to be forwarded over a path through the network which would cause the traffic to pass through the destination that corresponds with the end point of the OBP link. The decision as to what traffic should be placed on the OBP link is localized to the node at the end of the OBP link, since all other nodes along the OBP link will simply optically forward traffic and won't handle the traffic. Likewise, other nodes on the network will have limited visibility as to the existence of the OBP link and, hence, won't route traffic over the OBP link. The end node may place any traffic onto the OBP link that will ultimately flow through the end point of the OBP link. Traffic of this nature may be aggregated and placed onto the OBP link for transportation on the network.

For example, in a network implementing 802.1Qay, traffic on a PBB-TE tunnel may be placed on an OBP link corresponding to the tunnel. By establishing an OBP link to correspond to the PBB-TE tunnel, and then causing traffic from the PBB-TE tunnel to be placed the OBP link, a tight coupling between layer 2 and layer 1 may be created on the network. Thus, according to an embodiment, when a PBB-TE path is advertised, an OBP link may be created to follow the PBB-TE path where the advertised bandwidth is sufficiently large to justify establishment of a dedicated optical path (i.e. one or more dedicated wavelengths) through the underlying optical network.

OBP links are created by having dynamic optical switches at each or some of the routing/Ethernet switching nodes of a network to either drop/add traffic or to by-pass transient traffic. Signaling or manual configuration may be used to notify the transient hops to by-pass the assigned wavelength and to notify the destination node to drop the wavelength associated with the OBP.

The nodes on the network create OBP links where the aggregate traffic from that node to the other node on the network justifies creation of the OBP link. The ingress node will aggregate all traffic destined for a particular node and use the OBP link for that traffic. Thus, there is a tight coupling between the optical physical layer (layer 1) and the Ethernet layer (layer 2). Specifically, a dedicated physical path (layer 1 path) is created for particular flow of layer 2 traffic. Accordingly, cross-layer restoration becomes possible in the event of a failure on one of the layers. For example, by allowing spare capacity to exist in both layer 1 and layer 2, either layer can recover from failure/fault in the other layer. Thus, a higher degree of restoration optimization is possible. So, if an OBP link fails, it can be either restored by pushing the traffic through the multi-hop layer 2 network or by creating a diversely routed new OBP link. Conversely, when a layer 2 fault occurs, it can be restored either by another layer 2 path or by creating a new OBP link.

Since the response times for using these different recovery mechanisms may differ between the layers, the several recovery mechanisms may be used together to first quickly restore connectivity and, then later, to obtain a more efficient solution to the failure. For example, if an OBP link failed, it may be quicker to route all traffic from the OBP link over the hop-by-hop path through the network to quickly restore connectivity for the traffic. A new OBP link may then be determined to replace the failed OBP link. Once the new OBP link has been signaled on the network and has been established, the traffic may once again be directed to the new OBP link rather than the layer 2 network.

Figure 7A:
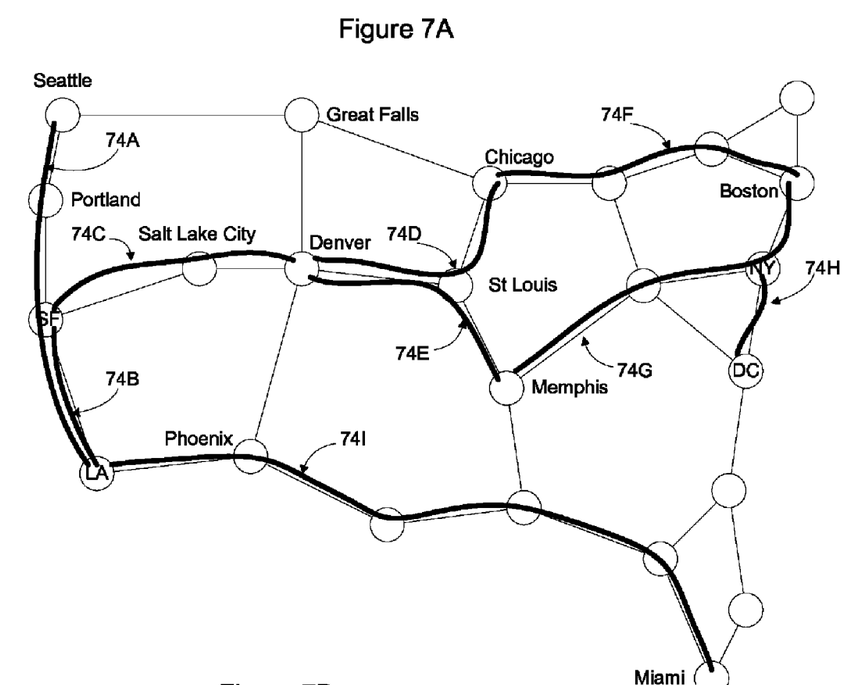
FIG. 7A is a functional block diagram of an example communication network showing OPB links.
Figure 7B:
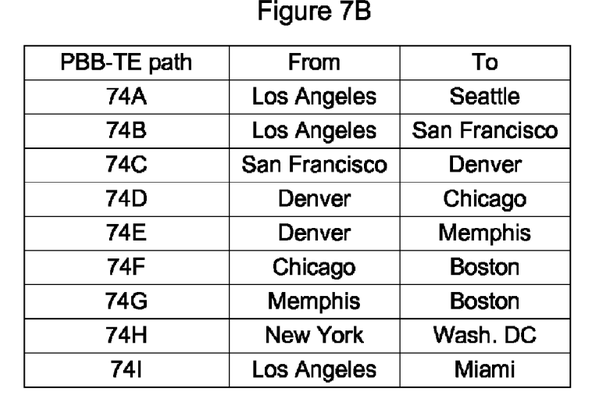
FIG. 7B is a table showing PBB-TE tunnels implemented on the communication network of FIG. 7A.

FIG. 7A shows an example network in which OBP links have been implemented to correspond with PBB-TE tunnels extending through the network. FIG. 7B shows a table of the OBP links that may be created to correspond to the PBB-TE tunnels. In the example shown in FIG. 7A, it will be assumed that there is a PBB-TE tunnel from Los Angeles to Seattle, for example. When the traffic on the PBB-TE tunnel exceeds a particular amount, it may be advantageous to establish an OBP link from Los Angeles to Seattle to carry the traffic that will be forwarded on the PBB-TE tunnel. Since traffic on the PBB-TE tunnel will always enter the network at Los Angeles and exit at Seattle, use of an OBP link to enable the intermediate nodes to directly switch traffic on the link is more efficient and less costly than requiring the intermediate nodes to inspect and route the traffic at each hop. By not advertising the extra capacity on the OBP path, the other network elements will not divert traffic to that area of the network so that addition of the OBP link to the network will not affect other traffic patterns on the network. This allows selective placement of OBP links to be used to alleviate congestion in the network without modifying traffic patterns on the network as a whole.

Implementing OBP links that coincide with PBB-TE tunnels also enables monitoring functions to follow the decisions of the data through the network. Specifically, the OBP link may be monitored to determine the presence of a fault on the OBP link. Since the data on the OBP link will flow through the same set of nodes as the PBB-TE tunnel, the presence of a fault on the OBP link will typically coincide with a fault on the PBB-TE tunnel. Thus, unlike MPLS or IP traffic that may take different paths through the network, traffic on the PBB-TE tunnel and an OBP link that follows the PBB-TE tunnel may be expected to have similar fault characteristics. This simplifies handling of fault and re-routing of traffic. In a normal IP or MPLS context, by contrast, the IP traffic may experience a fault on the network whereas the traffic on the OBP link would not. Thus, monitoring functions associated with the OBP link are simplified in the PBB-TE context where the OBP link are established to coincide with the PBB-TE tunnels.

Figure 6:
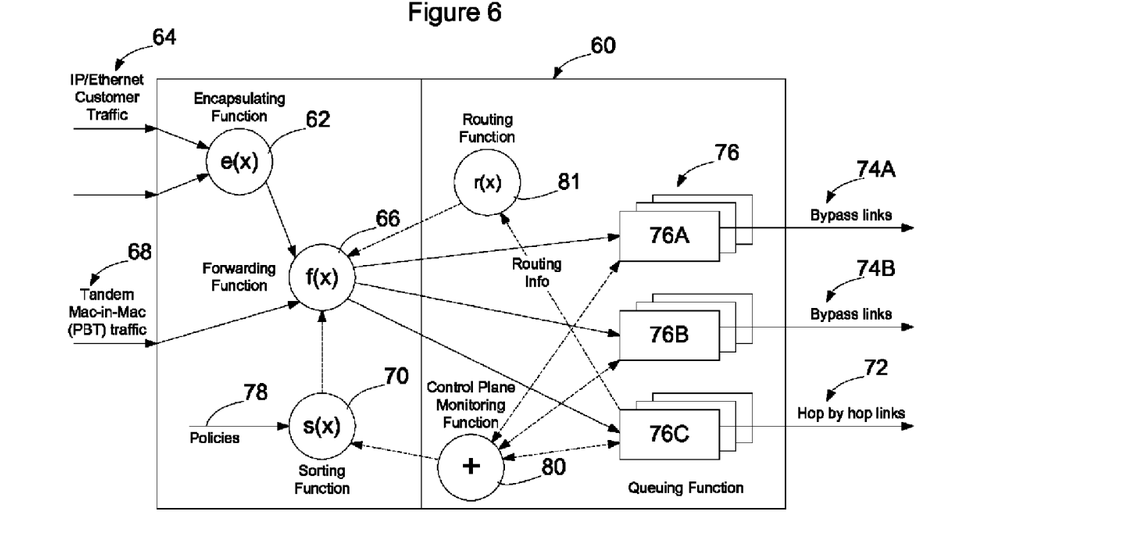
FIG. 6 is a functional block diagram of a network element configured to implement OBP links according to an embodiment of the invention.

FIG. 6 shows an example network element 60 that may be used to implement an endpoint of an OBP link according to an embodiment of the invention. As shown in FIG. 6, the network element includes an encapsulation function 62 to encapsulate IP/Ethernet customer traffic 64. Frequently, traffic received from a customer will be encapsulated for transportation on the provider network. Provider Backbone Bridging specified in IEEE 802.1ah, enables MAC-in-MAC encapsulation to take place so that Ethernet frames may be forwarded based on provider MAC address space (B-MAC) rather than customer MAC address (C-MAC) space. Provider Backbone Bridging—Traffic Engineering (PBB-TE or PBT) specified by 802.1Qay provides a similar encapsulation function, but enables forwarding on the network to be based on the provider destination MAC address (B-DA) and VLAN ID (B-VID). This enables traffic engineered tunnels to be created on the network. The encapsulation function 62 may perform either of these types of encapsulation processes or, alternatively, may implement another form of encapsulation. Encapsulated traffic is sent to a forwarding function 66.

Customer traffic is only encapsulated at the ingress to the provider network. Once encapsulated, the network elements on the network will use the outer MAC header to forward the traffic on the network. Thus, the network element 60 is not be required to encapsulate all traffic but rather only performs this function on customer traffic 64. Where the network element receives traffic 68 from another network element on the network, that traffic 68 will have already been encapsulated by another network element at the ingress to the network. Traffic of this nature may be passed directly to the forwarding function 66 without being passed through the encapsulation function.

The forwarding function 66, according to an embodiment of the invention, operates under the control of a sorting function 70, to either forward traffic over the hop-by-hop links 72 or over Optical Bypass (OBP) links 74A and 74B. A queuing function 76 (or individual queuing functions 76A, 76B, 76C) holds the traffic from the forwarding function to enable the traffic to be placed onto the appropriate link. Typically, a separate queuing function would be implemented for each of the links, although the particular way in which the traffic is handled and processed for transmission on the intended link is dependent on the particular implementation.

Normally, a network element will have a forwarding function, i.e. a forwarding information base, that is programmed into hardware on the network element. The forwarding hardware is commonly referred to as the network element data plane. A control plane of the network element implements a routing function 81 that determines how traffic is to be forwarded on the network. For example, the routing function will receive routing advertisements from other nodes on the network, generate a network topology database, calculate routes through the network, and otherwise determine how traffic is to be forwarded on the network. The routing function will program this information into the data plane to specify how traffic is to be forwarded using the hop-by-hop links on the network.

According to an embodiment of the invention, the sorting function 70 enables the data plane to selectively output similarly addressed traffic over an OBP link or the hop-by-hop links without requiring knowledge of the OBP links to affect allocation of resources by the routing function 81. In this manner, the sorting function can utilize the OBP links, so that additional capacity can be added to the network without changing the visible topology of the network from a routing perspective.

The sorting function 70 operates according to policies 78 which enable particular traffic to be selectively directed over the hop-by-hop links 72 or over the OBP links 74. The policies are local to the node and enable the node to decide how flows of traffic should be sorted. The policies may be, for example, that all traffic on a particular PBB-TE path should be directed to a particular one of the OBP links 74. Preferably the policies 78 are implemented on a per-flow basis rather than on a per-packet/frame basis, so that packets/frames that belong to a particular flow either all will be directed to the hop-by-hop links or all will be directed to the OBP links. This enables packets/frames within the flow to remain in order as they traverse the network.

A monitoring function 80 may monitor the queuing function to keep track of the amount of traffic queued for the bypass links 74 and hop-by-hop links 72. The monitoring function 80 will typically be a control plane function and enable the control plane to monitor how the data plane is behaving. When the monitoring function determines that the queuing function 76 has excess data queued at one of the links, it may modify the policies 78 used by the sorting function to divert traffic to the other type of link. Thus, for example, if the queuing function 76C serving the hop-by-hop links 72 has excess traffic stored for transmission on the hop-by-hop links, the monitoring function 80 may modify the policies 78 to cause additional flows of traffic to be moved from the hop-by-hop links to one of the OBP links 74. This may help to alleviate congestion on the hop-by-hop links 72. Similarly, if there is excess traffic on one of the OBP links 74, the monitoring function 80 will detect the excess traffic built in the queuing function and modify one of the policies 78 to shift some of the traffic from the OBP link 74 to another OBP link or to the hop-by-hop link 72.

Referring FIG. 7, assume that the network element 60 has been implemented in Los Angeles. In this example, it will be assumed that the bypass link 74A extends from Los Angeles through San Francisco and Portland Oregon to Seattle, that bypass link 74B extends from Los Angeles to San Francisco, and that the hop-by-hop links also extend from Los Angeles to San Francisco. The network element 60, in this instance, will have three options to forward traffic to Seattle. First, it can use bypass link 74A to forward traffic on an OBP directly to Seattle. Second, the network element 60 may use bypass link 74B to forward the traffic to San Francisco, at which point the traffic may be forwarded hop-by-hop the rest of the way to Seattle. Third, the network element can use normal hop-by-hop forwarding to forward the traffic to Seattle. In this example it has been assumed that the hop-by-hop forwarding will cause traffic to flow north through San Francisco. The hop-by-hop forwarding may cause the traffic to take a different route, however, such as through Phoenix, Denver, and Great Falls Montana, before getting to Seattle, without affecting the operation of this example.

The sorting function 70 will have policies 78 specifying which flows of traffic should be forwarded over links 74A, 74B, and 72. For example, the default policy may be that all flows which are destined for Seattle should be aggregated and forwarded over the bypass link 74A, to enable that traffic to be optically switched en-route to Seattle. This keeps traffic off the other hop-by-hop links by eliminating the need for the traffic to be processed by each intermediate node. If, however, the control plane monitoring function detects that the queue 76A is too long, the monitoring function may look at the queue 76B for the OBP link 74B to determine whether there is room on the OBP link 74B for the traffic. If so, some of the traffic may be shifted from OBP link 74A to OBP link 74B. Alternatively, the traffic may be shifted to the hop-by-hop links 72 to enable the traffic to be forwarded in a normal manner on the network.

When the network element receives traffic, it will process the traffic in a normal manner regardless of whether the traffic was received on a bypass link or on a hop-by-hop link. Specifically, the traffic that is placed onto the OBP link is not modified in any way and, thus, when the traffic is received by a network element off an OBP link, the network element may process the traffic as if it had been received off a normal hop-by-hop link. This stems from the fact that the traffic is directed, at the ingress to the OBP link, by a sorting function which does not require the frame headers or IP packet headers to be modified. Thus, the traffic on the OBP link will appear, to the egress node, the same as if it had been forwarded to the egress node over the hop-by-hop links.

The one modification that may be required by the egress node, depending on the implementation, is in connection with loop suppression. In some implementations the nodes on the network may be required to implement a loop prevention mechanism such as Reverse Path Forwarding Check (RPFC). RPFC is a check that may be performed by a network element to ensure that traffic has arrived at the node from the correct port. If traffic from a particular node arrives at an incorrect port, the network element may assume that a loop has occurred and drop the traffic. Since the traffic on an OBP link may arrive at a different port than it would if it had followed normal hop-by-hop forwarding, the loop prevention mechanism may need to be adjusted to enable the traffic that is received over the bypass link to be accepted by the egress node.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer program product stored on a non-transitory computer readable medium, the computer program product containing control logic which, when loaded into a computer processor, causes the processor to perform a method of utilizing an optical bypass link between a first network element and a third network element on a communication network, the method comprising the steps of:
    using, by the first network element, a routing function to program a forwarding function to forward traffic, which is destined for the third network element, via a first hop-by-hop link of a plurality of hop-by-hop links to a second network element in a path of network elements that includes the third network element based on a network topology database associated with a data-link layer of the communication network;
    setting at least one policy associated with a physical layer of the communication network related to use of the optical bypass link into a sorting function, the at least one policy directing the first network element to direct the traffic to the third network element via the optical bypass link, and wherein the optical bypass link is not identified in the network topology database; and
    using the sorting function to instruct the forwarding function to selectively divert at least a portion of the traffic on the communication network to the third network element via the optical bypass link without notifying the routing function that the at least a portion of the traffic is not being forwarded to the second network element via the first hop-by-hop link.

2. The computer program product of claim 1, wherein the routing function does not have knowledge of the existence of the optical bypass link on the communication network.

3. The computer program product of claim 1, wherein the sorting function operates under a local policy to selectively divert the at least a portion of the traffic to the optical bypass link.

4. The computer program product of claim 1, wherein the sorting function enables a second portion of the traffic to be forwarded over the hop-by-hop links on the communication network.

5. The computer program product of claim 1, further comprising a step of monitoring a queuing function to determine whether the hop-by-hop links or optical bypass link is experiencing congestion.

6. The computer program product of claim 5, further comprising the step of increasing a size of the portion of the traffic that is diverted to the optical bypass link when the hop-by-hop links are experiencing congestion.

7. The computer program product of claim 5, further comprising the step of decreasing a size of the portion of the traffic that is diverted to the optical bypass link when the optical bypass link is experiencing congestion.

8. The computer program product of claim 1, wherein the at least a portion of the traffic on the communication network that is diverted to the optical bypass link would normally flow through the second network element if it were to be forwarded over the hop-by-hop links on the communication network.

9. The computer program product of claim 1, wherein the optical bypass link is established to follow a PBB-TE tunnel on the communication network.

10. A system, comprising:
    a plurality of network elements interconnected by first links, wherein each network element is configured to operate a layer 2 routing protocol associated with a data-link layer of a network, and comprises a network topology database formed based on link state advertisements that identify the first links between the network elements, the network elements having resources allocated to flows of traffic on the network;
    a routing function that identifies a route through the network elements for a first flow of traffic via the first links, the route identifying a second network element to which a first network element is to communicate the flow of traffic based on the network topology database;
    an optical bypass link instantiated between the first network element and a third network element, the optical bypass link not identified in the network topology database;
    wherein the first network element maintains a policy associated with a physical layer of the network that identifies the flow of traffic and indicates the flow of traffic is to be directed over the optical bypass link to the third network element and thereby bypass the second network element; and
    wherein the first network element is configured to receive the flow of traffic, override the route through the network elements identified by the routing function, and direct the flow of traffic to the third network element via the optical bypass link and bypass the second network element.

11. The system of claim 10, wherein the optical bypass link is not advertised via the routing system.

12. The system of claim 10, wherein the network is an Ethernet network implemented to utilize traffic engineered tunnels, and wherein the optical bypass link is created to follow a traffic engineered tunnel.

13. The system of claim 12, wherein the optical bypass link is established in connection with signaling of the traffic engineered tunnel.

14. The system of claim 12, wherein the optical bypass link carries Ethernet traffic intended to be placed on the traffic engineered tunnel.

15. The system of claim 12, wherein the network is configured to implement hop-by-hop forwarding, and wherein the hop-by-hop forwarding is used as a backup for traffic on the optical bypass link.

16. The system of claim 10, wherein the optical bypass link is statically provisioned on the network.

17. The system of claim 10, wherein the optical bypass link is dynamically signaled on the network.

18. The system of claim 10, wherein the optical bypass link is of local significance to the first network element and the third network element, and wherein the first network element and the third network element forward traffic on the optical bypass link without modifying a header.

19. The system of claim 10, wherein each network element connected to the optical bypass link implements a sorting function to selectively forward at least a portion of the flow of traffic over the first links or over the optical bypass link according to a local policy at the network element.

20. A method of utilizing an optical bypass link between a first network element and a third network element on a communication network, the method comprising:
using, by the first network element, a routing function to program a forwarding function to forward traffic, which is destined for the third network element, via a first hop-by-hop link of a plurality of hop-by-hop links to a second network element in a path of network elements that includes the third network element based on a network topology database associated with a data-link layer of the communication network;
setting at least one policy associated with a physical layer of the communication network related to use of the optical bypass link into a sorting function, the at least one policy directing the first network element to direct the traffic to the third network element via the optical bypass link, and wherein the optical bypass link is not identified in the network topology database; and
using the sorting function to instruct the forwarding function to selectively divert at least a portion of the traffic on the communication network to the third network element via the optical bypass link without notifying the routing function that the at least a portion of the traffic is not being forwarded to the second network element via the first hop-by-hop link.

* * * * *